(12) United States Patent
Wang et al.

(10) Patent No.: US 7,817,219 B2
(45) Date of Patent: Oct. 19, 2010

(54) LIQUID CRYSTAL DISPLAY DEVICE COMPRISING A PASSIVATION LAYER HAVING A DEPRESSION OR CAVITY AT THE STEPS OF THE SOURCE AND DRAIN ELECTRODES

(75) Inventors: Yeong-Feng Wang, Tao Yuan Shien (TW); Liang-Pin Yu, Tao Yuan Shien (TW); Chih-Liang Liao, Tao Yuan Shien (TW); Chien-Hung Chen, Tao Yuan Shien (TW); I-Hua Ho, Tao Yuan Shien (TW); Yi-Wei Lee, Tao Yuan Shien (TW)

(73) Assignee: AU Optronics Corporation, Hsin-chu (TW)

( * ) Notice: Subject to any disclaimer, the term of this patent is extended or adjusted under 35 U.S.C. 154(b) by 860 days.

(21) Appl. No.: 11/647,260

(22) Filed: Dec. 29, 2006

(65) Prior Publication Data
US 2007/0153152 A1    Jul. 5, 2007

(30) Foreign Application Priority Data
Dec. 29, 2005    (TW) .............................. 94147190 A

(51) Int. Cl.
*G02F 1/136*    (2006.01)

(52) U.S. Cl. ............................ 349/43; 349/42; 349/138

(58) Field of Classification Search .................... 349/43, 349/42, 52
See application file for complete search history.

(56) References Cited

U.S. PATENT DOCUMENTS

| | | | | |
|---|---|---|---|---|
| 2004/0021805 A1* | 2/2004 | Nagata et al. | .................. | 349/43 |
| 2005/0030440 A1* | 2/2005 | Lee et al. | ....................... | 349/43 |
| 2005/0237442 A1* | 10/2005 | Yamazaki et al. | ............. | 349/43 |

\* cited by examiner

*Primary Examiner*—Andrew Schechter
*Assistant Examiner*—Dennis Y Kim
(74) *Attorney, Agent, or Firm*—Bacon & Thomas, PLLC

(57) ABSTRACT

A liquid crystal display device is disclosed, which comprises an upper substrate, a lower substrate, and a liquid crystal layer. The lower substrate has several pixel electrodes, metal lines, and switch elements thereon. Each switch element comprises a source electrode, a drain electrode, a gate electrode, and an opening between the source electrode and the drain electrode. A passivation layer covering the surface of the source electrode and the drain electrode forms two inclined planes separately on two sides. The two inclined planes face each other and are locating on a kink or step of the source electrode and drain electrode. The inclined planes also contact each other at the upper side of the opening. The inclinations of the inclined planes to the lower substrate are in a range from 5 to 50 degrees.

20 Claims, 7 Drawing Sheets

LIQUID CRYSTAL DISPLAY DEVICE COMPRISING A PASSIVATION LAYER HAVING A DEPRESSION OR CAVITY AT THE STEPS OF THE SOURCE AND DRAIN ELECTRODES

BACKGROUND OF THE INVENTION

1. Field of the Invention

The present invention relates to a liquid crystal display device, and more particularly, to a light guiding structure for use in a liquid crystal display device.

2. Description of Related Art

A liquid crystal display device applies the electric field (E-field) to control the rotation of the liquid crystal molecules, and thus controls the polarization direction of the light to form light switches. The light-leaking regions in which the rotation of the liquid crystal molecules is hardly controlled (i.e. the liquid crystal alignment defect region) are usually shielded by the black matrix. The black matrix prevents the light leakage of these regions from impairing the contrast of the image.

Moreover, since the amorphous silicon layer of the thin film transistor is easily illuminated by the ambient light through the opening locating between the source electrode and the drain electrode of the thin film transistor. When the amorphous silicon layer of the thin film transistor is illuminated, a current is generated (i.e. the light-current), and the current leakage of the thin film transistor in the "non-conducting state" is increased. Therefore, in order to stabilize the correct gray-leveled displaying of each updating frame of image, a black matrix is required to dispose above the opening of the thin film transistor to block the ambient light and maintain the "non-conducting state" of the thin film transistor.

Currently, the black matrix (light-shielding element) is usually made of metal or non-transparent polymer material. However, there are several limitations and drawbacks related to the light-shielding elements. For example, the black matrix made of metal, such as chromium metal or chromium oxide (Cr/CrOx), causes heavy metal pollution and results in design limitation of the liquid crystal display device for the undesirable "parasitic capacitance". On the other hand, the total thickness of the black matrix of polymers has to comply with the optical density of the polymer. For example, even though the optical density of the polymer is as large as four, the total thickness of the polymeric black matrix is still much thicker than that of the metal black matrix made. The black matrix with high thickness is not good for the structure of the liquid crystal display device. Besides, the rugged surface of the black matrix is not suitable for a rubbing process and the orientation of nearby liquid crystal molecules. Moreover, the efficiency of the lithography process is impaired for thicker material since the high thickness interferes the cross-linking of the polymer through the photo-chemical reaction. Therefore, the portion of the polymer material required to be kept after the lithography process is completely kept. The difficulty in manufacturing the black matrix made of polymer material thus increases.

Therefore, it is desirable to provide an improved liquid crystal display device to mitigate and/or obviate the aforementioned problems, which relates to the drawbacks of the manufacturing process of the liquid crystal display device and the black matrix thereof illustrated above.

SUMMARY OF THE INVENTION

The present invention provides a lower substrate for a liquid crystal display device and the liquid crystal display device therewith. The lower substrate for a liquid crystal display device illustrated suppress or reduce the direct transmission light by way of refraction, so as to block the "direct transmission light" in certain regions of the liquid crystal display device.

The lower substrate for a liquid crystal display device of the present invention comprises a substrate, and a plurality of switch elements on the substrate. Each switch elements comprises a source electrode, a drain electrode and a gate electrode. An opening is formed between the step of the source electrode and the step of the drain electrode of each switch element. A passivation layer covers the surface of the source electrode and the surface of the drain electrode, and forms two inclined planes on the step of the source electrode and the step of the drain electrode, respectively. The two inclined planes face each other to form a depression or a cavity in the opening. The inclinations of the inclined planes to the substrate are in a range from 5 to 50 degrees.

By having the depression or the cavity, the lower substrate for a liquid crystal display device of the present invention can control the light path of the transmission light, and can divert the transmission light which originally arrives at the region between the source electrode and the drain electrode of a switch element into other regions for absorption or further adjustment Therefore, the "transmission light" projected in the location between the source electrode and the drain electrode is blocked in the opening of the thin-film transistor. As a result, the current leakage of the thin-film transistor in the "non-conducting state" resulting from the light illumination to the amorphous-silicon ($\alpha$-Si) layer of the thin-film transistor is efficiently prevented.

Besides, the present invention also provides a liquid crystal display device comprising an upper substrate, a lower substrate, and a liquid crystal locating between the upper substrate and the lower substrate. A plurality of openings are formed on a top surface of the lower substrate. A passivation layer covers the surface of the lower substrate and forms two inclined planes on opposing sides of the openings. The two inclined planes face each other to form a depression or a cavity in the openings. The inclinations of the incline planes to the lower substrate are in a range from 5 to 50 degrees.

Similarly, by having the depression or the cavity, the light path of the transmission light can be controlled by way of the refractions of the transmission light. The transmission light from the backlight of a liquid crystal display device can be guided into the desired regions for absorption, or, be diverted from certain regions, for example the liquid crystal alignment malfunction region of the liquid crystal layer or the metal lines. Therefore, the transmission light is blocked in the certain regions illustrated above.

Although the black matrix used in the conventional liquid crystal display device can block the "transmission light" in certain regions as described above, the black matrix used in the conventional liquid crystal display device still has many drawbacks as follows. For example, if the black matrix, which shields the switch element or the metal lines from the transmission light, is metallic, the undesirable parasitic capacitance that arises can no longer be ignored. If the black matrix is polymeric, the thickness thereof is excessive and the surface thereof is too rugged. These drawbacks will cause the undesirable result of the rubbing process of the manufacturing process of a liquid crystal display device, as well as the undesirable orientation of the liquid crystal molecules of the liquid crystal layer thereof.

Besides, the depression or the cavity formed in the substrate (or the lower substrate) of the present invention can be made of any kind of transparent passivation material, such as silicon oxide or silicon nitride. Therefore, the problems related to the parasitic capacitance and the "heavy metal pollution" are easily solved. Moreover, since the depression or the cavity is formed at the corner of the step structure (i.e. the opening) on the surface of the substrate (or the lower substrate) of the present invention, the problems related to the high thickness and the rugged surface of the black matrix which blocks the transmission light are solved, too.

According to the present invention, an overhanging structures are formed near the corners of the electrodes of the thin-film transistor resulted from the bad coverage of the passivation layer over the step structures of the electrodes during the deposition of the thin films, such as the physical vapor deposition (PVD) process or the chemical vapor deposition (CVD) process. Moreover, between two nearby overhanging structures, a depression or a cavity a width of the bottom-side portion larger than that of the top-side portion is formed. When the two nearby. overhanging structures are too close to each other, a void is formed between them. Therefore, with the depression or the cavity (or the void) formed after the deposition of the thin films, the incident light (i.e. the transmission light) can be guided to certain regions of the substrate to be absorbed or be further adjusted. Therefore, by applying the law of refraction (Snell's Law), the non-transparent thin layer (black matrix) is optional for the liquid crystal display device of the present invention, and the thickness of the thin film can be further adjusted. In the present invention, the refraction angles of the layers are varied with the refractive indices of the layers. Besides, the best angle of the optical structure of the depression or the cavity of the present invention is determined by Snell's law.

In summary, the present invention applies the drawbacks of the manufacturing process of the thin films and the refraction to form a light guiding structure, wherein the light guiding structure can guide the incident light to certain regions where the incident light can be absorbed or be further adjusted. Therefore, the light guiding structure of the present invention can block the incident light in certain regions of the liquid crystal display device and the aforesaid problems related to the metallic black matrix and the polymeric black matrix are thus solved.

The lower substrate for a liquid crystal display device of the present invention can optionally further comprises a plurality of metal lines. Therefore, the liquid crystal display device of the present invention can have formed thereon a plurality of opening on the surfaces of the metal lines. A passivation layer covers the surfaces of the metal lines and forms two inclined planes at opposing sides of the openings. The two inclined planes face each other and form a depression or a cavity in the openings. Alternatively, a depression or a cavity can be formed on the top surface of the lower substrate of the present invention, wherein the depression or the cavity corresponds to the metal lines of the lower substrate. As a result, the incident light originally transmitted to the metal lines can now be guided into other regions to prevent light leakage from happening. Therefore, the contrast of the image of the liquid crystal display device is improved.

The passivation layer of the lower substrate of the present invention can be made of any kind of material used in the passivation layer of the lower substrate. Preferably, the passivation layer of the lower substrate of the present invention is made of a transparent material. More preferably, the passivation layer of the lower substrate of the present invention is made of silicon oxide or silicon nitride. The depression (or the cavity) of the lower substrate of the present invention can be a closed depression (or the cavity) or an opened depression (or the cavity), preferably the cavity of the lower substrate is a closed cavity. The depression (or the cavity) of the lower substrate of the present invention can have a cross-section of any shape, preferably the width at the bottom-side portion of the depression (or the cavity) is larger than the width at the top-side portion of the depression (or the cavity), and most preferably the cross-section of the depression (or the cavity) is triangular or trapezoid-shaped. The refractive index of the passivation layer of the lower substrate of the present invention is preferably in a range from 1.2 to 2, and more preferably in a range from 1.2 to 1.8. The aspect ratio of the opening of the lower substrate of the present invention is preferably in a range from 0.05 to 1, and more preferably in a range from 0.05 to 0.08.

The opening on the top surface of the lower substrate of the present invention can locate at any region where the light needs to be blocked. Preferably, the opening is below the display malfunction region of the liquid crystal layer, or below the metal lines. The passivation layer of the liquid crystal display device of the present invention can be made of any kind of conventional passivation material. Preferably, the passivation layer is made of a transparent material, and more preferably made of a silicon oxide or a silicon nitride. The depression (or the cavity) of the liquid crystal display device of the present invention can be a closed depression (or the cavity) or an opened depression (or cavity). Preferably, the cavity of the liquid crystal display device is a closed cavity. The depression (or the cavity) of the liquid crystal display device of the present invention can have a cross-section of any shape. Preferably the width at the bottom-side portion of the depression (or the cavity) is larger than the width at the top-side portion of the depression (or the cavity), and more preferably the cross-section of the depression (or the cavity) is triangular or trapezoid-shaped. The refractive index of the passivation layer of the liquid crystal display device of the present invention is preferably in a range from 1.2 to 2, and more preferably from 1.2 to 1.8. The aspect ratio of the opening of the liquid crystal display device of the present invention is preferably larger than 1, and more preferably larger than 4.

As described above, the present invention applies the drawbacks of the manufacturing process of the thin films, in order to form a stripe-like structure having a triangular cross-section. Since when the refractive indices of two mediums separated by an interface therebetween are different from each other, the light passing through the interface will deviate from its original path after it passes through the interface. Thus, by controlling the inclination of the optical structure of the depression or the cavity formed in the opening, not only the incident light having an incident angle in a certain range will be reflected, but also the incident light of a backlight can be effectively diverted and be further controlled. As a result, the lower substrate for a liquid crystal display device of the present invention can be used as a light guiding element, as well as a light-shielding element. Besides, the aforesaid problems related to the metallic black matrix and the polymeric black matrix can also be solved.

Other objects, advantages, and novel features of the invention will become more apparent from the following detailed description when taken in conjunction with the accompanying drawings.

DETAILED DESCRIPTION OF THE EMBODIMENT

The openings of the liquid crystal display device of the present invention can guide the incident light to the desired region of the LCD for further absorption or adjustment. Examples of the openings of the present invention can be referred to the openings formed between the source electrode and the drain electrode of a thin-film transistor, and the openings at the interface between the display region and the non-display region of the liquid crystal display device, etc.

In the embodiments of the present invention, the light has different refractive angles because the film layers that the light passes through have different refractive indices. Therefore, the best angle of the optical structure of the depression or the cavity of the present invention is determined by Snell's law.

Embodiment 1

Thin Film Transistor (Front Face Light Guiding)

In a thin film transistor (TFT), the semiconductor layer (amorphous silicon layer) of the TFT is light conductive, and the incident light from the ambient environment can easily illuminate at the semiconductor layer of the TFT through the opening formed between the source electrode and the drain electrode of the TFT. Therefore, the incident light must be blocked at the openings locating between the source electrode and the drain electrode of the TFT so as to maintain the "non-conducting state" between the source electrode and the drain electrode of the TFT, and the existence of current leakage resulting from the incident light is thus prevented. In the present embodiment, the light, which originally arrives at the region between the source electrode and the drain electrode of the TFT, is diverted away as being total-reflected. That is, the light is blocked in the region between the source electrode and the drain electrode of the TFT.

Figure 1:
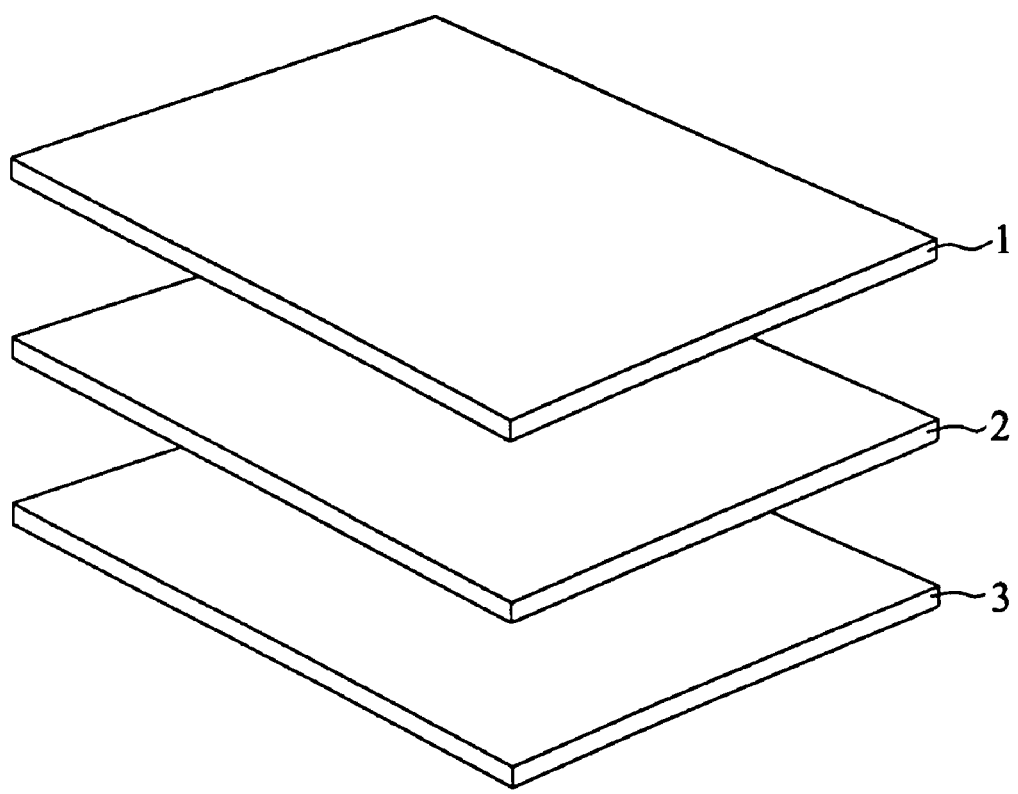
FIG. 1 is a schematic perspective view of a liquid crystal display device, according to the first embodiment of the present invention.

FIG. 1 is a schematic perspective view of the structure of the liquid crystal display device of the present invention. The liquid crystal display device comprises an upper substrate 1, a lower substrate 3 and a liquid crystal layer 2 locating between the upper substrate 1 and the lower substrate 3. There are several pixel electrodes, source lines, gate lines, and switch elements (not shown in the figure) on the top surface of the lower substrate 3. In the present embodiment, the switch elements are thin film transistors (TFTs).

Figure 2:
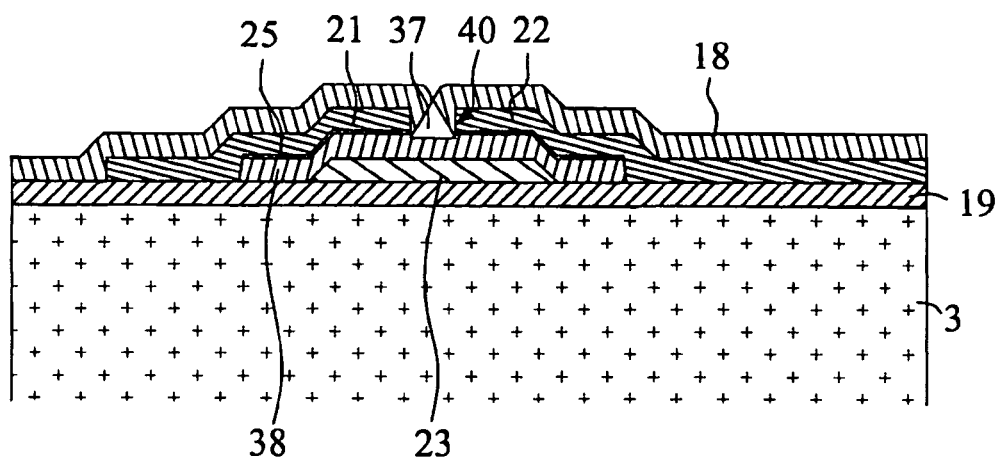
FIG. 2 is a schematic cross-section view of a thin film transistor, according to the first embodiment of the present invention.

With reference to FIG. 2, which is a schematic cross-section view of the thin film transistor of the present embodiment, the thin film transistor comprises a substrate 3, a gate insulation layer 19, a gate electrode 23, a semiconductor layer 38, an ohmic contact layer 25, a source electrode 21, a drain electrode 22 and a passivation layer 18. During the manufacturing process of the thin film layer, such as the physical vapor deposition (PVD) process or the chemical vapor deposition (CVD) process, a plurality of inclined planes are formed at the corners of the step structure for the limitations of the deposition process. In the present embodiment, a step-shaped opening 40 is formed between the source electrode 21 and the drain electrode 22 of the thin film transistor. The depth-width-ratio of the step-shaped opening 40 is in a range from 0.05 to 1. As shown in FIG. 2, two inclined planes are respectively formed on the step of the source electrode 21 and the step of the drain electrode 22, wherein the two inclined planes face each other. A depression or a cavity the width of which at the bottom-portion is larger than the width at the top-side portion thereof is formed between the two nearby passivation layers, such as the spike-shaped cavity 37 (i.e., a triangular cross-section) shown in FIG. 2. In the present embodiment, the two inclined planes contact each other above the step-shaped (overhang) opening 40, and thus the spike-shaped cavity 37 is a closed cavity in the opening 40 (the inclination of which equals to $2\theta v$). With the spike-shaped cavity 37, the incident light will be guided to certain regions where the incident light is absorbed or further controlled. Therefore, the non-transparent film (black matrix) is now optional and the thickness of the thin film is also adjustable.

Figure 3:
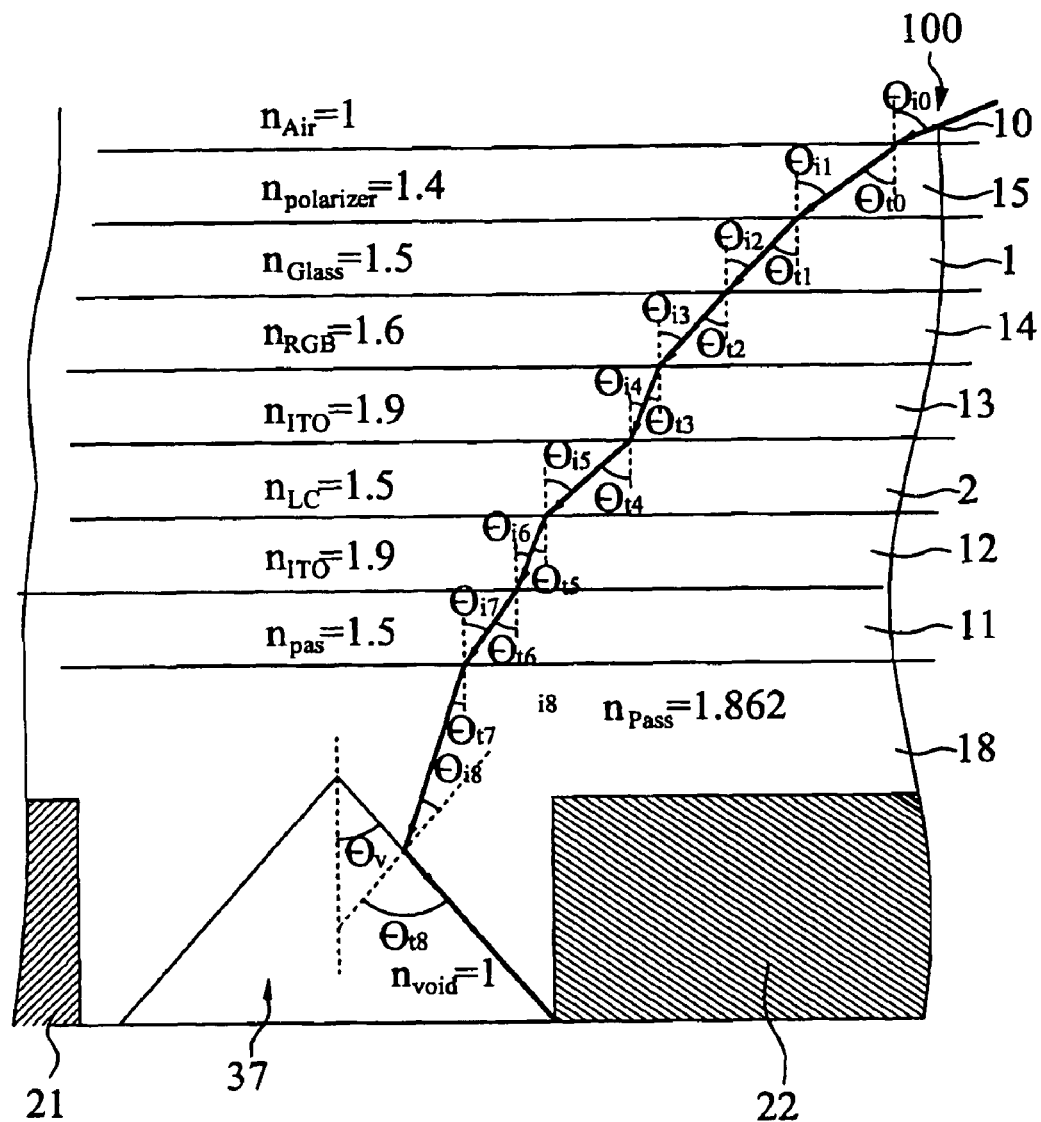
FIG. 3 is an optical analytical diagram showing how the incident light from ambient environment enters the cavity of the thin film transistor, according to the first embodiment of the present invention.

FIG. 3 is an optical analytical diagram showing how the incident light 100 from ambient environment enters the cavity 37 of the thin film transistor, according to the first embodiment of the present invention. Simultaneously referring to FIG. 2 and FIG. 3, as shown in FIG. 3, a flattening layer 11 (refractive index=1.5), a transparent electrode layer 12 (refractive index=1.9), a liquid crystal layer 2 (refractive index=1.5), a transparent electrode layer 13 (refractive index=1.9), a colored photoresist 14 (refractive index=1.6), an upper substrate 1 (refractive index=1.5), and a polarizing plate 15 (refractive index=1.4) are stacked sequentially over the surface of the passivation layer 18 (refractive index=1.87). The refractive indices of the ambient air 10 (outside the liquid crystal display device) and the air inside the cavity 37 are both 1.

In the present embodiment of the present invention, the film layers have different refractive angles for their different refractive indices. Therefore, the best angle of the optical structure of the cavity 37 is determined by Snell's law.

In FIG. 3, $\theta i0$ through $\theta i8$ are the incident angles, $\theta t0$ through $\theta t8$ are the refractive angles, and $\theta v$ is the inclination of the optical structure of the cavity 37 of the passivation layer 18. The light path of the light 100 is analyzed by employing Snell's law. The approximate values of the angles are as follows: θ V=25°, θ i0<90°, θ t0=46.14°, θ i1=46.14°, θ t1=42.3°, θ i2=42.3°, θ t2=39.12°, θ i3=39.12°, θ t3=32.09°, θ i4=32.09°, θ t4=42.3°, θ i5=42.3°, θ t5=30.29°, θ i6=30.29°, θ t6=42.3°, θ i7=42.3°, θ t7=32.67°, θ i8=32.33°, and θ t8=90°.

As a result, by making the inclination of the cavity 37 smaller than or equal to 50° (2 θ v) through the adjustments of the manufacturing process, all the incident light 100 from the ambient environment will not enter the cavity 37. Instead, the incident light 100 entering the interior of the liquid crystal display panel is diverted away as being total-reflected. That is, the incident light 100 is blocked at the cavity 37. Therefore, no "light-current" is generated because no incident light 100 is able to illuminate at the semiconductor layer 38 of the thin film transistor.

Figure 4:
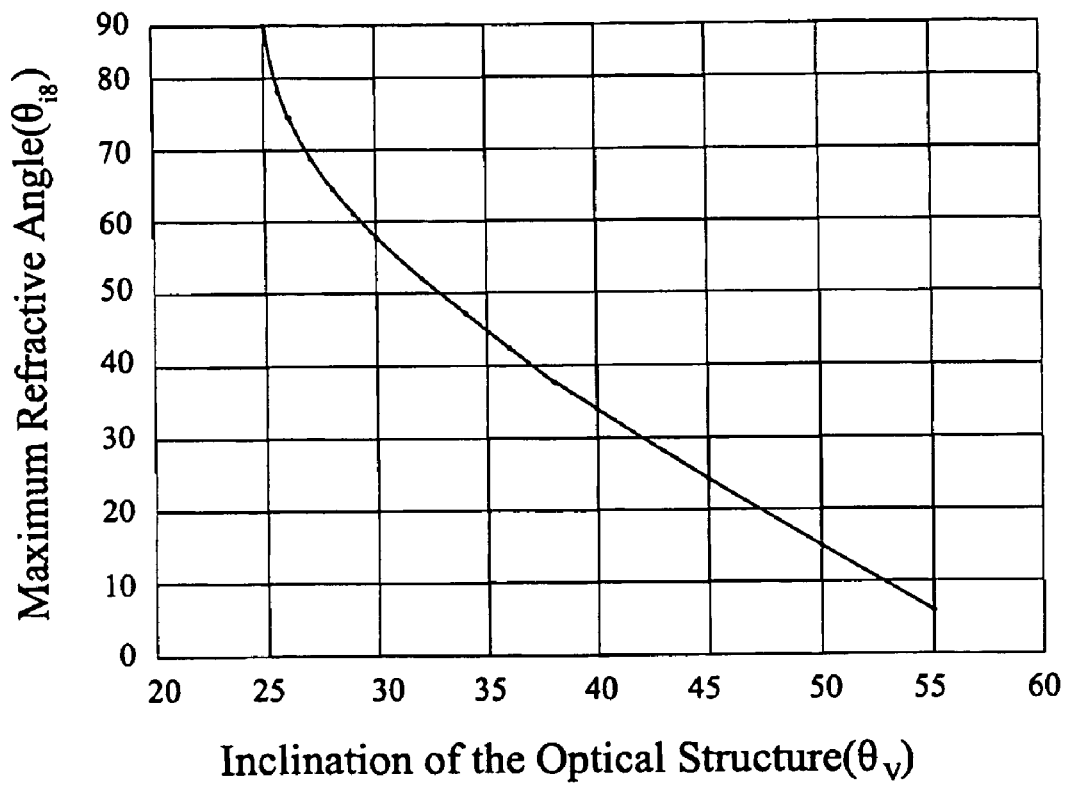
FIG. 4 is a diagram showing the relation between the inclination of the optical structure ($\theta v$) and the maximum refractive angle ($\theta t8$).

FIG. 4 is a diagram showing the relation between the inclination of the optical structure (θ v) and the maximum refractive angle (θ t8). When the inclination of the optical structure (θ v) is smaller than or equals to 25°, all the incident light from the ambient environment will be totally reflected.

As described above, due to refraction, the incident light is diverted away from the opening locating between the source electrode and the drain electrode of the thin-film transistor, and the current leakage is thus be prevented. Besides, since the light conducting structure of the present invention (i.e. the depression or the cavity) can be made of any kind of transparent passivation material, such as silicon oxide and silicon nitride, the problems related to parasitic capacitance and heavy metal pollution is also solved. Moreover, since the depression or the cavity is formed at the regions near the corners of the step structure (i.e. the opening between the source electrode and the drain electrode), the problems related to the rugged surface of the black matrix and the high thickness thereof are solved, too.

Embodiment 2

Glass Substrate (Back Face Light Guiding)

In general, not all of the liquid crystal molecules of a liquid crystal display device are well aligned, as a result of the drawbacks of the manufacturing process of the liquid crystal display device. The light of the backlight of a liquid crystal display device does not enter the liquid crystal display device in parallel. In fact, when 75% of the energy of the light is distributed in a region of which the incident angle ranges from positive 60 degrees to minus 60 degrees and the light enters the liquid crystal display device at the region where the liquid crystal molecules are not well aligned (i.e. the liquid crystal alignment defect region), the image of the liquid crystal display device will have some bright spots resulting from the light leakage.

Figure 5:
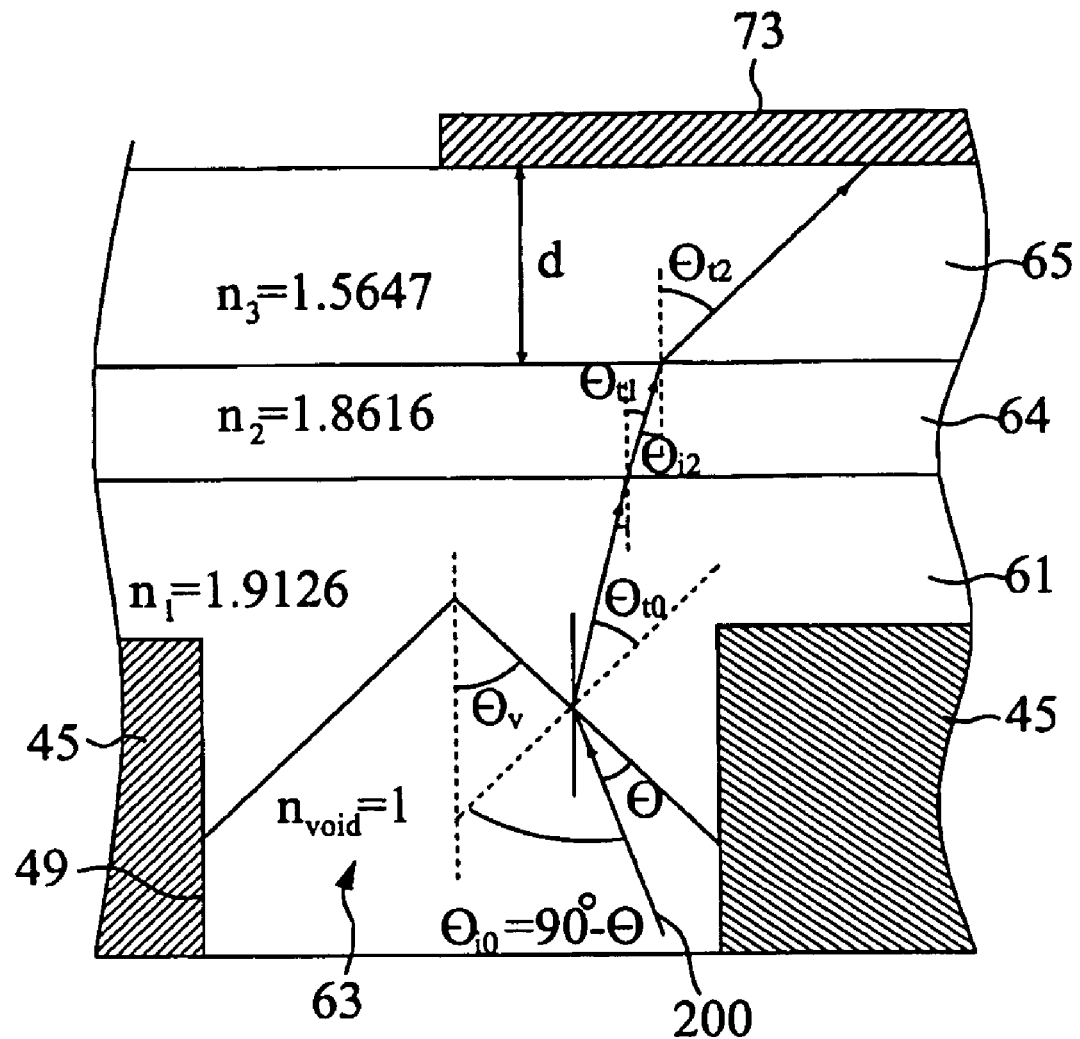
FIG. 5 is an optical analytical diagram showing how the incident light from a backlight enters the liquid crystal layer through the cavity of the glass substrate, according to the second embodiment of the present invention.

FIG. 5 is an optical analytical diagram showing how the incident light from a backlight enters the liquid crystal layer through the cavity of the glass substrate, according to the second embodiment of the present invention. With reference to FIG. 5, the light 200 of a backlight (not shown) enters the liquid crystal alignment defect region 73 of the liquid crystal layer through the groove 49 of the glass substrate 45. The groove 49 is formed in the glass substrate 45 by an etching process, and the depth-width-ratio of which is larger than 1. Therefore, during the manufacturing process of forming the thin film layers on the upper surface of the substrate 45, such as the physical vapor deposition (PVD) process or the chemical vapor deposition (CVD) process, a plurality of inclined planes are formed at the corners of the step structure for the limitations of the deposition process.

Figure 8A:
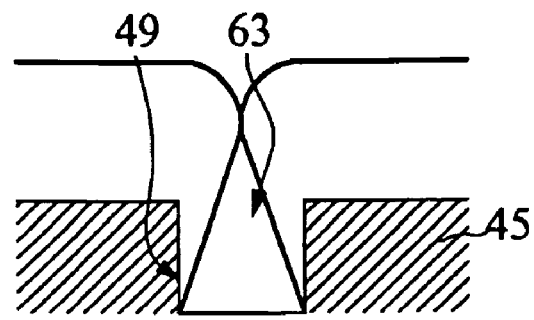
FIGS. 8a through 8c are schematic cross-section views showing the formation of a cavity in the gate electrode passivation layer as a result of the thin film deposition process.
Figure 8B:
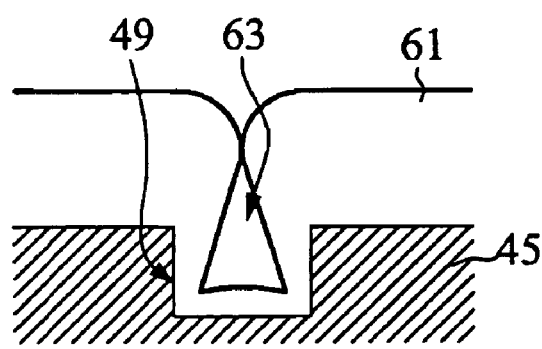
Figure 8C:
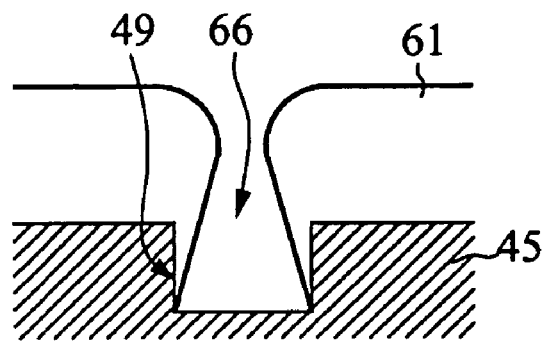

As shown in FIG. 5, a gate electrode passivation layer 61 covers the surface of the glass substrate 45 and forms two inclined planes on two opposing sides of the groove 49. The two inclined planes face each other. A depression 66 or a cavity 63 (as shown in FIG. 8a through FIG. 8c) is formed between the two inclined planes of the passivation layer, wherein the width at the bottom-side portion of the depression 66 or the cavity 63 is larger than the width at the top-side portion thereof. In the present embodiment, the two inclined planes contact each other at the upper side of the groove 49. Therefore, the spike-shaped cavity 63 (i.e., a triangular cross-section) is a closed cavity. Besides, the gate electrode passivation layer 61 can be formed by the physical vapor deposition (PVD) process or the chemical vapor deposition (CVD) process.

Moreover, a protective layer 64 (refractive index=1.87), a flattening layer 65 (refractive index=1.5), a transparent electrode layer 12 (refractive index=1.9), and a liquid crystal alignment defect region 73 are also stacked sequentially on the surface of the gate electrode passivation layer 61 (refractive index=2.91). The thickness of the protective layer 64 is 0.2 μm, and the thickness of the flattening layer 65 is 3 μm.

In FIG. 5, θ i0 through θ i2 are the incident angles and θ t0 through θ t2 are the refractive angles. θ v is the inclination of the optical structure of the cavity 63 of the passivation layer 61. Take θ v=25° as an example, the light path of the light 200 is analyzed by employing Snell's law. When the incident angle is about θ i0=65°, the approximate values of other angles are as follows: θ t0=28.17°, θ i1=36.83°, θ t1=37.99°, θ i2=37.99° (the alternate angle of θ t1), and θ t2=50.12°.

Besides, when the inclination (θ v) equals to 25°, and the incident angle (θ i0) equals to 65°, the deviation distance of the light 200 can be derived by the following equation:

$$\Delta = \Sigma d_n \times \tan \theta_n;$$

wherein dn are the thicknesses of respective layers, θ n are the deviated angles of the light in respective layers, and Δ is the displacement (deviation distance).

Therefore, the deviation distance of the light 200 is larger than 3 μm. Thus, in the present embodiment, the light 200 can be diverted from the liquid crystal alignment defect region 73, and the light leakage can thus be prevented.

Figure 6:
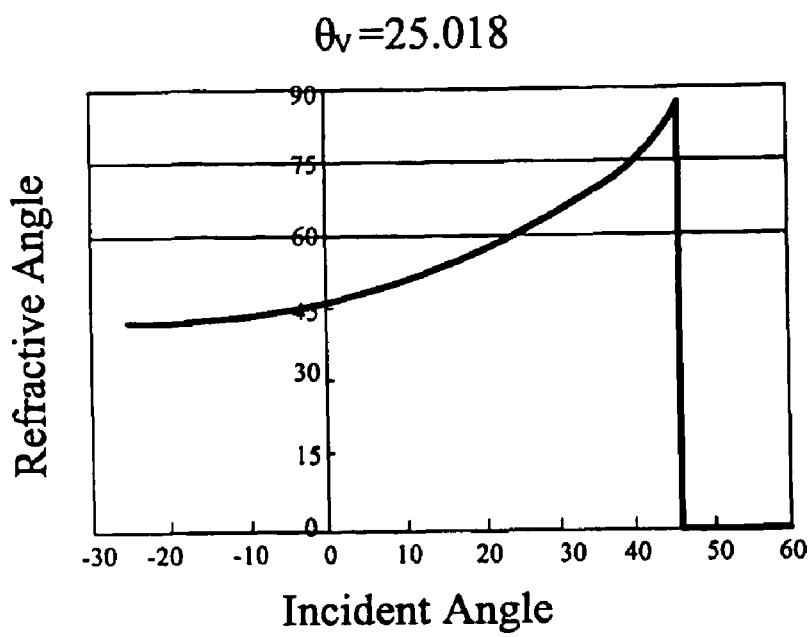
FIG. 6 is a diagram showing the relation between the incident angles of the light ($\theta$) from a backlight to the refractive angles ($\theta t2$), wherein the inclination of the optical structure of the cavity ($\theta v$) is 25 degrees.
Figure 7:
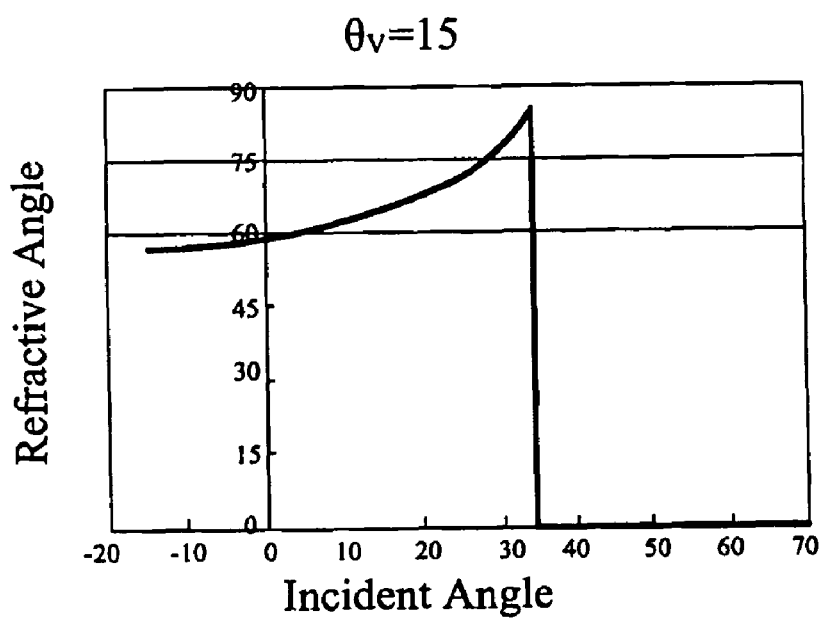
FIG. 7 is a diagram showing the relation between the incident angles of the light ($\theta$) from a backlight to the refractive angles ($\theta t2$), wherein the inclination of the optical structure of the cavity ($\theta v$) is 15 degrees.

FIG. 6 is a diagram showing the relation between the incident angles of the light 200 from a backlight to the refractive angles, wherein the inclination of the optical structure of the cavity is 25 degrees. FIG. 7 is a diagram showing the relation between the incident angles of the light 200 of a backlight to the refractive angles, wherein the inclination of the optical structure of the cavity is 15 degrees.

As shown in FIG. 6 and FIG. 7, the refractive angle (i.e. the deviation angle θ t2) of FIG. 7 (θ v=15°) is larger than that of FIG. 6 (θ v=25°). In other words, when the inclination (θ v) is smaller, the resultant deviation angle (θ t2) is larger, and the deviation distance (displacement Δ) is also larger. Therefore, with a proper design of the optical structure of the cavity 63, the light 200 is diverted away from the liquid crystal alignment defect region 73, and the light leakage is prevented. Moreover, for the optical structure of the present embodiment of the present invention, the deviation of the incident light is even better when the incident light is polarized.

As described above, the present invention applies the drawbacks of the manufacturing process of the thin films and refraction, in order to form a light conducting structure (i.e. the depression or the cavity) for guiding the incident light into a desired region where the incident light is absorbed or further controlled. Hence, the light conducting structure of the present embodiment can be used in any region of the lower substrate for a liquid crystal display where the light needs to be blocked, such as the liquid crystal alignment malfunction region or the metal lines, in order to prevent the light leakage and improve the contrast of image of the liquid crystal display device. Moreover, since the light conducting structure (i.e. the depression or the cavity) can be made of any kind of transparent passivation material, such as silicon oxide and silicon nitride, the problems related to parasitic capacitance and heavy metal pollution are solved. On the other hand, because the depression or the cavity is formed at the regions near the corners of the step-structure (i.e. the groove between the source electrode and the drain electrode), the problems related to the rugged surface of the black matrix and the high thickness thereof are solved, too. Besides, since the lower substrate for a liquid crystal display device of the present invention can be used as a light guiding element, as well as a light-shielding element, the problems related to the metallic black matrix and the polymeric black matrix are solved.

Although the present invention has been explained in relation to its embodiments, it is to be understood that many other possible modifications and variations can be made without departing from the scope of the invention as hereinafter claimed.

What is claimed is:

1. A lower substrate for use in a liquid crystal display device, comprising:
    a substrate;
    a plurality of switch elements on the substrate, wherein each of the switch elements comprises a source electrode, a drain electrode and a gate electrode, wherein an opening is formed between a step of the source electrode and a step of the drain electrode; and
    a passivation layer covering the surface of the source electrode and the surface of the drain electrode so as to form two inclined planes on the step of the source electrode and the step of the drain electrode respectively, wherein the two inclined planes face each other to form a depression or a cavity in the opening and the width at the bottom-side portion of the depression or the cavity is larger than the width at the top-side portion of the depression or the cavity.

2. The lower substrate of claim 1, wherein the passivation layer is made of a transparent material.

3. The lower substrate of claim 1, wherein the passivation layer is made of a silicon oxide or a silicon nitride.

4. The lower substrate of claim 1, wherein the depression or the cavity has a triangular cross-section.

5. The lower substrate of claim 1, wherein the refractive index of the passivation layer is in a range from 1.2 to 2.

6. The lower substrate of claim 1, wherein the depth-width-ratio of the opening is in a range from 0.05 to 1.

7. The lower substrate of claim 1, further comprising at least one metal line having an opening on the surface thereof, wherein the passivation layer covers the surface of the metal line and forms inclined planes at opposing sides of the opening to form a depression or a cavity in the opening.

8. The lower substrate of claim 1, wherein the inclinations of the inclined planes to the substrate are in a range from 5 to 50 degrees.

9. The lower substrate of claim 4, wherein the depression or the cavity is spike-shaped.

10. The lower substrate of claim 1, wherein the inclination of the depression or the cavity is $\leqq 50°$.

11. The lower substrate of claim 1, wherein the lower substrate comprises thin film layers formed by physical vapor deposition (PVD) or chemical vapor deposition (CVD).

12. The lower substrate of claim 1, wherein the inclination of the depression or the cavity is $\leqq 25°$.

13. The lower substrate of claim 1, wherein the depression or cavity is made of a transparent passivation material.

14. The lower substrate of claim 13, wherein the transparent passivation material is silicon oxide or silicon nitride.

15. The lower substrate of claim 1, wherein the depression or cavity is formed at regions near the opening between the step of the source electrode and the step of the drain electrode.

16. A lower substrate for use in a liquid crystal display device, comprising:
    a substrate;
    a plurality of switch elements on the substrate, wherein each of the switch elements comprises a source electrode, a drain electrode and a gate electrode, wherein an opening is formed between a step of the source electrode and a step of the drain electrode; and
    a passivation layer covering the surface of the source electrode and the surface of the drain electrode so as to form two inclined planes on the step of the source electrode and the step of the drain electrode respectively, wherein the two inclined planes face each other to form a depression or a cavity in the opening and the depression or cavity is a closed depression or cavity.

17. The lower substrate of claim 16, wherein the depression or cavity is formed at regions near the opening between the step of the source electrode and the step of the drain electrode.

18. The lower substrate of claim 16, wherein the inclination of the depression or cavity is $\leqq 50°$.

19. The lower substrate of claim 16, wherein the inclination of the depression or cavity is $\leqq 25°$.

20. A front face light guide comprising the lower substrate of claim 1.

* * * * *